United States Patent
Wilkes

(10) Patent No.: US 7,516,372 B2
(45) Date of Patent: Apr. 7, 2009

(54) PROCESSOR CONTROL SYSTEM FOR SUPPLYING CONTROL INSTRUCTIONS TO A PROCESSOR

(75) Inventor: Dyson Wilkes, Marlborough (GB)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 10/502,541

(22) PCT Filed: Jan. 27, 2003

(86) PCT No.: PCT/EP03/00806

§ 371 (c)(1),
(2), (4) Date: May 11, 2005

(87) PCT Pub. No.: WO03/065222

PCT Pub. Date: Aug. 7, 2003

(65) Prior Publication Data
US 2005/0240823 A1    Oct. 27, 2005

(30) Foreign Application Priority Data
Jan. 28, 2002    (GB) ................................. 0201889.3

(51) Int. Cl.
G06F 11/00    (2006.01)
(52) U.S. Cl. ........................................................ 714/54
(58) Field of Classification Search .................... 714/54
See application file for complete search history.

(56) References Cited

U.S. PATENT DOCUMENTS

| 4,542,453 A | 9/1985 | Patrick et al. |
| 4,675,646 A | 6/1987 | Lauer |
| 4,751,703 A | 6/1988 | Poiraud et al. |
| 5,408,672 A | 4/1995 | Miyazawa et al. |
| 5,517,630 A | 5/1996 | Tasaki |
| 5,592,613 A | 1/1997 | Miyazawa et al. |
| 5,757,690 A | 5/1998 | McMahon |
| 5,796,972 A | 8/1998 | Engelbrecht et al. |
| 5,870,601 A | 2/1999 | Getzlaff et al. |
| 5,901,225 A * | 5/1999 | Ireton et al. ..................... 714/7 |
| 6,141,740 A | 10/2000 | Mahalingaiah et al. |
| 6,158,018 A * | 12/2000 | Bernasconi et al. ............ 714/8 |
| 6,260,157 B1 * | 7/2001 | Schurecht et al. .............. 714/8 |
| 2001/0052066 A1 * | 12/2001 | Lee et al. ..................... 712/248 |

FOREIGN PATENT DOCUMENTS

WO    WO 92/08231    5/1992

* cited by examiner

Primary Examiner—Scott T. Baderman
Assistant Examiner—Paul F. Contino
(74) Attorney, Agent, or Firm—Lee & Hayes, PLLC

(57) ABSTRACT

A processor control system allows stored program code to be replaced. The original code can be stored entirely in a first memory, for example a ROM, with correction instructions stored in a second memory, for example a RAM, and the second memory is accessed only when a correction instruction exits. Received memory addresses are divided into a first plurality of most significant bits, and a second plurality of least significant bits. Only when the second plurality of least significant bits are all equal to zero, and there is a correction instruction stored in the RAM with an address which equals the most significant bits, the correction instruction is read and supplied to the processor. This, employs relatively little additional hardware, and the efficiency of the system is improved.

17 Claims, 3 Drawing Sheets

PROCESSOR CONTROL SYSTEM FOR SUPPLYING CONTROL INSTRUCTIONS TO A PROCESSOR

TECHNICAL FIELD OF THE INVENTION

This invention relates to a processor control system, and in particular to a system for supplying control instructions to a processor, allowing correction of those instructions when required.

BACKGROUND OF THE INVENTION

Many electronic devices include embedded processors, which operate on the basis of program data supplied thereto. The devices therefore include means for storing the program data. Typically, the means for storing the program data is a read-only memory (ROM), as this is typically the most efficient type of storage available.

However, storing the program data entirely on ROM has the disadvantage that the system becomes inflexible, in that it is not possible to update or correct the stored program data.

U.S. Pat. No. 5,592,613 discloses a microprocessor with a program memory and a program correction circuit. The program correction circuit includes an electrically programmable nonvolatile memory for storing address data and correction program data. The stored address data denote the addresses in the program memory where the stored program data is to be replaced by the correction program data.

However, this has the disadvantage that each address supplied to the system must be compared with the address data stored in the nonvolatile memory, which can compromise the speed of the processor.

U.S. Pat. No. 4,751,703 discloses a method of storing the control code for a processor, using a ROM, as well as a read/write memory (in the form of a random access memory RAM) which includes a code area and a patch area. Thus, the control code is virtually divided into a number of blocks, with the first instruction of each block stored in the code area of the RAM, and the subsequent instructions of each block stored in the ROM. When it is determined that a block of code contains an error, the first instruction of that block, stored in the RAM, can be replaced by a branch instruction, which causes subsequent instructions to be read from the patch area of the RAM. The patch can then be stored in the RAM, with the final instruction of the patch returning the control to the previous control code.

However, this system has the disadvantage that the RAM needs to be addressed once in each block of code, which is relatively inefficient when there are no corrections to implement.

SUMMARY OF THE INVENTION

According to the present invention, there is provided a processor control system in which, by employing relatively little additional hardware, the efficiency of the system can be improved.

In particular, the original code can be stored entirely in a first memory, for example a ROM, with correction instructions stored in a second memory, for example a RAM, and the second memory is accessed only when a correction instruction exists. Received memory addresses are divided into a first plurality of most significant bits, and a second plurality of least significant bits. Only when the second plurality of least significant bits are all equal to zero, and there is a correction instruction stored in the RAM with an address which equals the most significant bits, the correction instruction is read and supplied to the processor.

This has the advantage that the additional power consumption is low when there is no correction instruction stored.

This has the further advantage that the system does not require any arbitrary address comparisons to determine the locations for which correction instructions exist, and so the processor speed is not compromised.

DETAILED DESCRIPTION OF THE PREFERRED EMBODIMENTS

Figure 1:
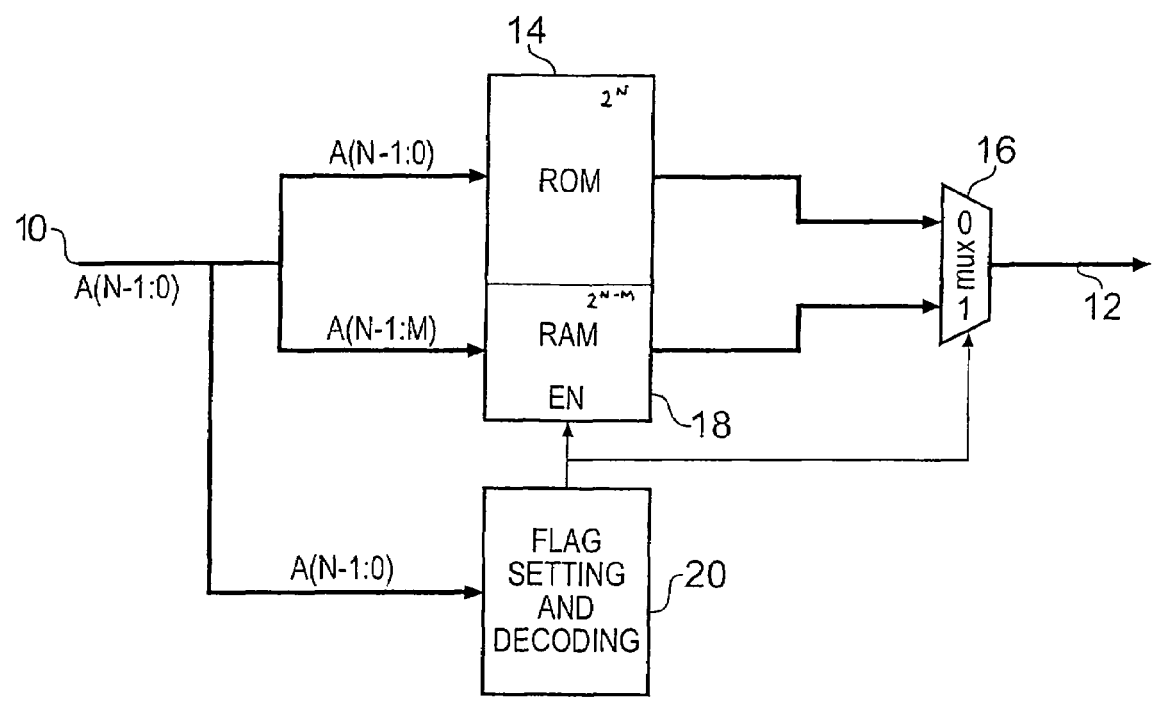
FIG. 1 is a block schematic diagram of a system according to the present invention.

FIG. 1 is a block schematic diagram, showing a system in accordance with an aspect of the present invention. The system receives inputs on an input line 10, and provides output instructions to a processor (not shown) on an output line 12. The inputs take the form of N bit addresses $A(N-1:0)$, the notation $A(N-1:0)$ meaning that the $(N-1)$th bit is the most significant bit of the address and the 0th bit is the least significant bit of the address.

Program code for the processor is stored in a ROM 14, which has $2^N$ locations, corresponding to the $2^N$ possible N bit addresses. When an address $A(N-1:0)$ is received on the input line 10, the instruction stored at the corresponding memory location is read out, and supplied to a multiplexer 16, which usually passes the signal from the ROM 14 to the processor.

Thus, when there are no corrections to the original program code, it can be read out continuously from the ROM 14. However, the system also includes means for storing and reading correction instructions. Specifically, the system also includes a RAM 18, and a flag setting and decoding circuit 20. The RAM 18 has $2^{N-M}$ locations, addressed by the $(N-M)$ most significant bits of the addresses received on the input line 10.

The flag setting and decoding circuit 20 also receives the N bit addresses received on the input line 10. As will be described in more detail with respect to FIG. 2, a flag is set whenever a correction instruction is stored. The flag setting and decoding circuit 20 tests whether the M least significant bits of an input address are zero, and also tests whether a flag has been set for the $(N-M)$ most significant bits of that address. If so, the RAM 18 is enabled, the instruction stored in the RAM is read out, and the multiplexer 16 is controlled to pass the signal from the RAM 18 onto the output line 12.

Figure 2:
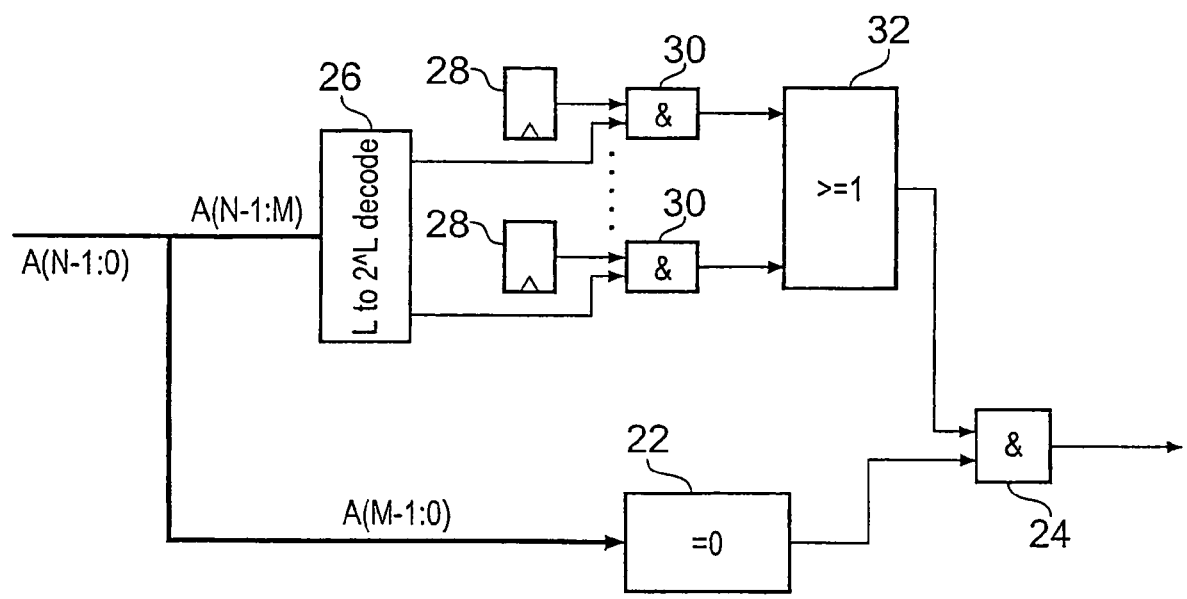
FIG. 2 is a block schematic diagram of a part of the system of FIG. 1.

FIG. 2 shows in more detail the form of the flag setting and decoding circuit 20. The received address $A(N-1:0)$ is divided into its M least significant bits $A(M-1:0)$ and its $N-M$ most significant bits $A(N-1:M)$. The least significant bits are supplied to a block 22, where it is determined whether all of the bits are equal to zero. If so, a binary 1 is passed to an AND gate 24. Otherwise, a binary 0 is passed to the AND gate 24. The most significant bits are passed to a decoding block 26, which resolves the N–M bit inputs into $2^{N-M}$ outputs. When a correction instruction is stored in the RAM 18 at a particular N–M bit address, a flag is set in a corresponding latch 28. Any flag is supplied to a respective AND gate 30, which also receives an input from the decoding block 26.

Thus, when the decoding block 26 determines that a specific one of the AND gates 30 has been selected by the N–M bit address, and a flag has been set on the corresponding latch 28, the respective AND gate 30 supplies an output to a block 32. The block 32 provides an output signal when it receives a signal from one of the AND gates 30, and an output signal from the block 32 is provided to a second input of the AND gate 24.

Thus, if a flag has been set, the AND gate 24 provides an output signal when the M least significant bits of the address A(M−1:0) are all equal to zero, and the N−M most significant bits of the address A(N−1:M) correspond to the latch 28 on which the flag has been set.

In that case, the output signal from the AND gate 24 is supplied to the RAM 18 to enable it, and also to the multiplexer 16, so that the instruction read from the RAM 18 is supplied to the processor.

It should be noted that the multiplexer 16 can be omitted from the system if the RAM and ROM both have a high output impedance when not enabled. An enabling signal for the RAM 18 would correspond to a non-enabling signal for the ROM 14, and consequently, the high output impedance of the ROM 14 would ensure that it is the output from the RAM 18 that is supplied to the processor. Conversely, when the ROM 14 is enabled, the high output impedance of the RAM 18 ensures that the output from the ROM 14 is supplied to the processor.

As mentioned above, a flag is set when a correction instruction is stored in the RAM 18. For example, the decode circuit 26 may also be used to set any flags.

As described so far, the decode circuit 26 is active at all times, but it will be apparent that an output is provided from the AND gate 24 for only a small proportion of the time. Therefore, to save power, the decode circuit 26 can be enabled only when the comparison circuit 22 produces an output indicating that the M least significant bits of the address are all zero. This ensures that the decode circuit block 26 will be active only at times when the RAM can be activated.

The instructions stored in the RAM 18 can advantageously be unconditional jump instructions, specifying a memory location at which replacement code can be stored. For example, the memory location can be in a separate RAM or non-volatile memory (such as a Flash memory), which may already be provided on the device for another purpose.

Figure 3:
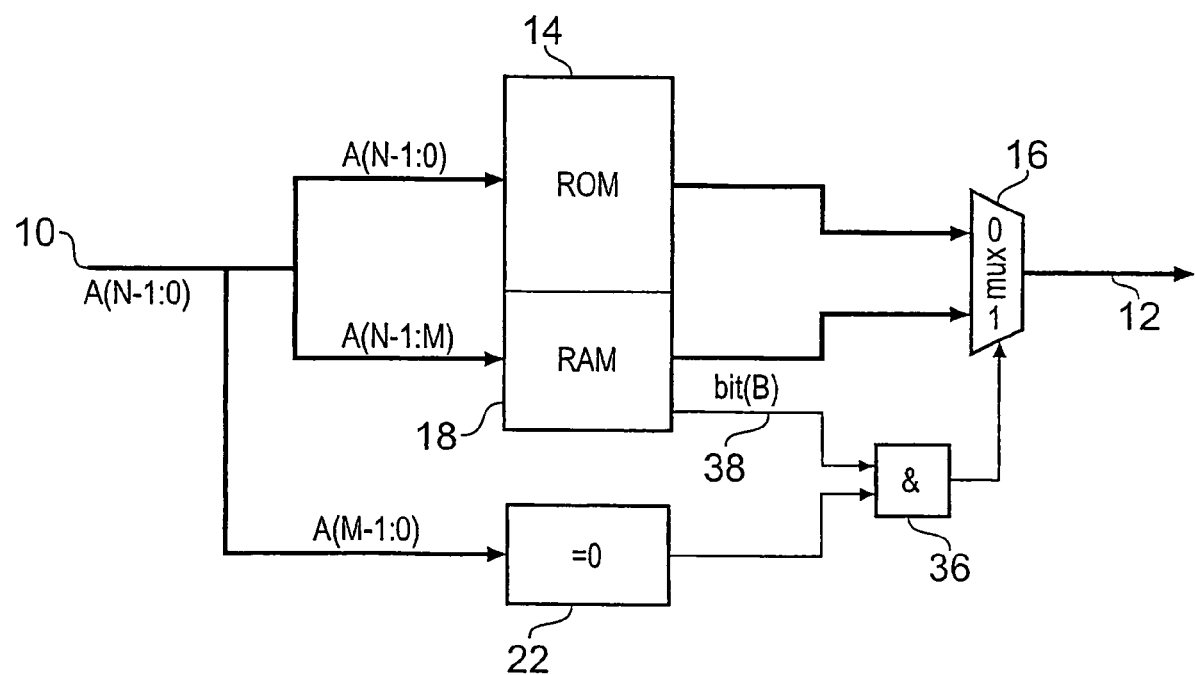
FIG. 3 is a block schematic diagram of an alternative system according to the present invention.

FIG. 3 shows an alternative embodiment of the invention, in which reference numerals which are the same as reference numerals used in FIG. 1 indicate similar components.

In this case, the M least significant bits (M−1:0) of the received address (N−1:0) are supplied to a comparison block 22, which provides an output when all of these bits are zero. The output is supplied to an AND gate 36. In order to test whether a correction instruction has been stored in the RAM 18, an output from the RAM 18 itself is examined. Specifically, if the correction instructions take the form of unconditional jump instructions, as described above, then it will be possible to rely on the fact that one specific bit of the data stored in the RAM 18 (identified here as "B") will take the binary value 1 if, and only if, a correction instruction is stored at that address in the RAM 18.

The bit "B" is supplied on line 38 to the second input of the AND gate 36, which therefore controls the multiplexer 16 to supply the output from the RAM 18 to the processor, only if the M least significant bits of the address A(M−1:0) are all equal to zero, and the N−M most significant bits of the address A(N−1:M) define an address in the RAM 18 at which a correction instruction has been stored.

In a further modification of the system shown in FIG. 3, the RAM 18 may have a field which is one bit wider than is required to store the correction instructions. In that case, the extra bit can be used as the bit "B", and used to store a flag bit, when a correction instruction is stored at that address.

There is therefore described a system which allows replacement of program code, without having a large adverse effect on the performance of the processor or the rest of the device.

The invention claimed is:

1. A processor control system, for use with a processor, the control system comprising:
   means for receiving a sequence of addresses, each address comprising first and second pluralities of address bits;
   a first memory, for containing a set of instructions for the processor at memory locations in said first memory corresponding to all of said addresses;
   a second memory, suitable for containing only correction instructions for the processor at memory locations in said second memory corresponding to respective combinations of said first plurality of address bits;
   means for determining, for each received address, when all of said second plurality of address bits in the received address are equal to zero, and, in that event, for determining whether the second memory contains a correction instruction at the memory location corresponding to said first plurality of address bits in said received address; and
   means for supplying an output instruction in response to each received address, the output instruction being a correction instruction read from the second memory in the event that all of said second plurality of address bits in a received address are equal to zero and it is determined that the second memory contains a correction instruction at the memory location corresponding to said first plurality of address bits in said received address, and the output instruction otherwise being read from the first memory.

2. A processor control system as claimed in claim 1, further comprising:
   a multiplexer, connected to receive instructions read from the first memory and the second memory, and
   further connected to receive a control signal, and being adapted to output the instructions from the either the first memory or the second memory, in dependence on the control signal.

3. A processor control system as claimed in claim 2, further comprising:
   means for generating a control signal for said multiplexer, the control signal being such that the output instruction is the instruction read from the second memory in the event that all of said second plurality of address bits in a received address are equal to zero and it is determined that the second memory contains a correction instruction at the memory location corresponding to said first plurality of address bits in said received address, and the output instruction is otherwise the instruction read from the first memory.

4. A processor control system as claimed in claim 1 further comprising:
   a third memory, for storing replacement code, wherein the second memory is suitable for containing correction instructions in the form of unconditional jump instructions specifying addresses in the third memory.

5. A processor control system as claimed in claim 1, further comprising:
   means for setting a flag when a correction instruction is stored in the second memory; and
   wherein the means for determining whether the second memory contains a correction instruction at the memory location corresponding to said first plurality of address bits in said received address comprises means for testing whether the respective flag has been set.

6. A processor control system as claimed in claim 5, wherein the means for testing whether the respective flag has been set is disabled unless it is determined that all of said second plurality of address bits in a received address are equal to zero.

7. A processor control system as claimed in claim 5, wherein the second memory is suitable for containing at each memory location a correction instruction and a flag bit, which is set only when the memory location contains a correction instruction, and wherein the means for testing whether the respective flag has been set comprises means for testing the value of said flag bit.

8. A processor control system as claimed in claim 1, wherein the means for determining whether the second memory contains a correction instruction at the memory location corresponding to said first plurality of address bits in said received address comprises means for testing the value of a specific bit at said memory location, wherein the specific bit takes a particular value in all cases when the second memory contains a correction instruction at said memory location.

9. A processor control system, for use with a processor, the control system comprising:
an input line for receiving a sequence of N bit addresses, each address comprising M least significant address bits and N–N most significant address bits;
a read only memory (ROM), for containing a set of instructions for the processor at memory locations in said ROM corresponding to all of said addresses;
a random access memory (RAM), suitable for containing only correction instructions for the processor at memory locations in said RAM corresponding to respective combinations of said most significant address bits;
a flag setting and decoding circuit for determining, for each address received on the input line, when all of said least significant address bits in the received address are equal to zero, and, in that event, for determining whether the RAM contains a correction instruction at the memory location corresponding to said most significant address bits in said received address; and
means for supplying an output instruction in response to each received address, the output instruction being a correction instruction read from the RAM in the event that all of said least significant address bits in a received address are equal to zero and it is determined that the RAM contains a correction instruction at the memory location corresponding to said most significant address bits in said received address, and the output instruction otherwise being read from the ROM.

10. A processor control system as claimed in claim 9, further comprising:
a multiplexer, connected to receive instructions read from the first memory and the second memory, and
further connected to receive a control signal, and being adapted to output the instructions from the either the first memory or the second memory, in dependence on the control signal.

11. A processor control system as claimed in claim 10, further comprising:
means for generating a control signal for said multiplexer, the control signal being such that the output instruction is the instruction read from the second memory in the event that all of said second plurality of address bits in a received address are equal to zero and it is determined that the second memory contains a correction instruction at the memory location corresponding to said first plurality of address bits in said received address, and the output instruction is otherwise the instruction read from the first memory.

12. A processor control system as claimed in claim 9 further comprising:
a third memory, for storing replacement code, wherein the second memory is suitable for containing correction instructions in the form of unconditional jump instructions specifying addresses in the third memory.

13. A processor control system as claimed in claim 9, further comprising:
means for setting a flag when a correction instruction is stored in the second memory; and
wherein the means for determining whether the second memory contains a correction instruction at the memory location corresponding to said first plurality of address bits in said received address comprises means for testing whether the respective flag has been set.

14. A processor control system as claimed in claim 13, wherein the means for testing whether the respective flag has been set is disabled unless it is determined that all of said second plurality of address bits in a received address are equal to zero.

15. A processor control system as claimed in claim 13, wherein the second memory is suitable for containing at each memory location a correction instruction and a flag bit, which is set only when the memory location contains a correction instruction, and wherein the means for testing whether the respective flag has been set comprises means for testing the value of said flag bit.

16. A processor control system as claimed in claim 9, wherein the means for determining whether the second memory contains a correction instruction at the memory location corresponding to said first plurality of address bits in said received address comprises means for testing the value of a specific bit at said memory location, wherein the specific bit takes a particular value in all cases when the second memory contains a correction instruction at said memory location.

17. A processor control system, for use with a processor, the control system comprising:
an input line for receiving a sequence of N bit addresses, each address comprising M least significant address bits and N–M most significant address bits;
a read only memory (ROM), for containing a set of instructions for the processor at memory locations in said ROM corresponding to all of said addresses;
a random access memory (RAM), suitable for containing only correction instructions for the processor at memory locations in said RAM corresponding to respective combinations of said most significant address bits;
a flag setting and decoding circuit for determining, for each address received on the input line, when all of said least significant address bits in the received address are equal to zero and for setting a flag when a correction instruction is stored in the RAM corresponding to said most significant address bits in said received address;
a multiplexer, connected to receive instructions read from the ROM and the RAM and a control signal, the control signal controlling output instructions of the multiplexer such that the output instruction may contain:
the instruction read from the RAM in the event that:
a) all of said least significant address bits in a received address are equal to zero; and
b) the flag has been set; or otherwise the instruction read from the ROM.

* * * * *

UNITED STATES PATENT AND TRADEMARK OFFICE
CERTIFICATE OF CORRECTION

PATENT NO. : 7,516,372 B2 Page 1 of 1
APPLICATION NO. : 10/502541
DATED : April 7, 2009
INVENTOR(S) : Dyson Wilkes et al.

It is certified that error appears in the above-identified patent and that said Letters Patent is hereby corrected as shown below:

On the Title Page, change the Assignee from "Microsoft Corporation" to "Infineon Technologies AG, Munchen, Germany"

Signed and Sealed this

Sixteenth Day of March, 2010

David J. Kappos
*Director of the United States Patent and Trademark Office*